United States Patent
Yang et al.

(10) Patent No.: US 10,047,905 B2
(45) Date of Patent: Aug. 14, 2018

(54) GIMBAL AND UNMANNED AERIAL VEHICLE INCLUDING THE SAME

(71) Applicant: ZEROTECH (SHENZHEN) INTELLIGENCE ROBOT CO., LTD., Shenzhen (CN)

(72) Inventors: Jianjun Yang, Beijing (CN); Hongtao Sun, Beijing (CN)

(73) Assignee: ZEROTECH (SHENZHEN) INTELLIGENCE ROBOT CO., LTD., Shenzhen (CN)

( * ) Notice: Subject to any disclaimer, the term of this patent is extended or adjusted under 35 U.S.C. 154(b) by 0 days.

(21) Appl. No.: 15/109,258

(22) PCT Filed: Mar. 24, 2015

(86) PCT No.: PCT/CN2015/074939
§ 371 (c)(1),
(2) Date: Jun. 30, 2016

(87) PCT Pub. No.: WO2015/144040
PCT Pub. Date: Oct. 1, 2015

(65) Prior Publication Data
US 2016/0327206 A1 Nov. 10, 2016

(30) Foreign Application Priority Data
Mar. 24, 2014 (CN) .................... 2014 2 0136422 U

(51) Int. Cl.
*F16M 13/00* (2006.01)
*F16M 13/02* (2006.01)
(Continued)

(52) U.S. Cl.
CPC ......... *F16M 13/022* (2013.01); *B64C 39/024* (2013.01); *B64D 47/08* (2013.01);
(Continued)

(58) Field of Classification Search
CPC ............ B64D 47/08; F16F 15/04; F16F 15/08
(Continued)

(56) References Cited

U.S. PATENT DOCUMENTS 4,570,960 A 2/1986 Peetz
5,529,277 A 6/1996 Ostaszewski
(Continued)

FOREIGN PATENT DOCUMENTS

CN 101554925 A 10/2009
CN 202337361 U 7/2012
(Continued)

OTHER PUBLICATIONS

International Search Report dated May 28, 2015 issued in PCT/CN2015/074939.
(Continued)

*Primary Examiner* — Steven M Marsh
(74) *Attorney, Agent, or Firm* — Scully Scott Murphy & Presser

(57) ABSTRACT

A gimbal includes a base and a fixing support rotatably provided on the base, wherein the fixing support includes a first mounting seat and a second mounting seat, and the second mounting seat is provided with an inner cavity therein. An unmanned aerial vehicle including a gimbal is also provided.

18 Claims, 3 Drawing Sheets

(51) Int. Cl.
- *F16M 11/10* (2006.01)
- *F16M 11/18* (2006.01)
- *F16M 11/20* (2006.01)
- *B64C 39/02* (2006.01)
- *B64D 47/08* (2006.01)
- *F16M 11/06* (2006.01)

(52) U.S. Cl.
CPC .............. *F16M 11/06* (2013.01); *F16M 11/10* (2013.01); *F16M 11/18* (2013.01); *F16M 11/2071* (2013.01); *F16M 13/02* (2013.01)

(58) Field of Classification Search
USPC ................... 248/603, 638, 674, 676; 396/13
See application file for complete search history.

(56) References Cited

U.S. PATENT DOCUMENTS

| | | | | |
|---|---|---|---|---|
| 5,897,223 | A * | 4/1999 | Tritchew | G02B 27/644 348/144 |
| 6,542,181 | B1 | 4/2003 | Houska et al. | |
| 9,280,038 | B1 * | 3/2016 | Pan | G03B 17/561 |
| 9,360,740 | B2 | 6/2016 | Wagner et al. | |
| 9,458,963 | B1 | 10/2016 | Choi et al. | |
| 2005/0185089 | A1 | 8/2005 | Chapman | |
| 2014/0037278 | A1 * | 2/2014 | Wang | F16M 11/10 396/55 |
| 2015/0308618 | A1 | 10/2015 | Valero | |
| 2016/0198088 | A1 * | 7/2016 | Wang | H04N 5/23238 348/36 |
| 2016/0229556 | A1 * | 8/2016 | Zhou | B64D 47/08 |
| 2016/0327847 | A1 * | 11/2016 | Yang | B64D 47/08 |
| 2017/0002975 | A1 * | 1/2017 | Yang | F16M 13/02 |
| 2017/0078538 | A1 * | 3/2017 | Zhu | H04N 5/232 |
| 2017/0089513 | A1 * | 3/2017 | Pan | F16M 13/022 |

FOREIGN PATENT DOCUMENTS

| | | |
|---|---|---|
| CN | 202647109 U | 1/2013 |
| CN | 103029834 A | 4/2013 |
| CN | 203757300 U | 8/2014 |
| CN | 203757311 U | 8/2014 |
| CN | 203784603 U | 8/2014 |
| CN | 203785682 U | 8/2014 |
| CN | 203786453 U | 8/2014 |

OTHER PUBLICATIONS

Office Action issued in U.S. Appl. No. 15/109,272 dated Apr. 19, 2017.

Office Action issued in U.S. Appl. No. 15/109,242 dated Apr. 21, 2017.

* cited by examiner

GIMBAL AND UNMANNED AERIAL VEHICLE INCLUDING THE SAME

TECHNICAL FIELD

The present application is related to a gimbal and an unmanned aerial vehicle including the same.

BACKGROUND

A gimbal is a support component used for mounting and fixing an imaging device such as a camera, and is divided into a stationary type and an electric motorized type. A stationary gimbal is suitable for the situation with a relative small monitor range, after the camera has been mounted on the stationary gimbal, the camera can be adjusted in terms of its horizontal rotation angle and its pitch angle, and when the final attitude is achieved, it can be put into operation only after the adjusting mechanism is locked.

An electric motorized gimbal is suitable for scanning, shooting and monitoring a relative large range. For the situation with high requirements upon operation, during the running of the gimbal, because a carrier body (e.g., an aerial vehicle, a ship, or the like) is subjected to high frequency vibration and low frequency jitter, for addressing this problem, a gyroscopic self-balance gimbal having three degrees of freedom has been put into the market, to compensate for the stability problem incurred from the above variation. In this kind of gimbal, attitude variation of the imaging device is detected by an electronic device, to control a servo to carry out reverse compensation, so as to achieve stable image taking.

However, a known gimbal has a complex structure and suffers from improper operation of mounting, and for example an electronic speed governor is amounted under an electric motor via a cover, which affects the appearance and is unfavorable for protection of components.

SUMMARY

An object of the present utility application is to provide a mounting structure of an electronic speed governor in a gimbal.

According to an aspect of the present utility application, a mounting structure of an electronic speed governor in a gimbal, including a base configured to be fixed with a carrier body, a first support rotatably connected with the base and rotatable on a Z axis direction, a second support rotatably connected with the first support and rotatable on an X axis direction, a third support for carrying an imaging apparatus rotatably connected with the second support and rotatable on a Y axis direction; the first support is an L-shaped arm and includes a first arm for connecting with the base and a second arm for connecting with the second support, and the second arm is provided, at a sidewall thereof, with a recess in which the electronic speed governor is provided and further includes a cover for enclosing the recess.

Preferably, the second support is an L-shaped arm and includes a third arm for connecting with the first support and a fourth arm for connecting with the third support, and the fourth arm is provided, at a sidewall thereof, with a recess in which the electronic speed governor is provided, and further includes a cover for enclosing the recess.

Preferably, the recess is arranged along a lengthwise direction of the second arm.

Preferably, the third support includes a support plate for rotatably connecting with the second support, and includes an upper mounting seat and a lower mounting seat respectively fixed on both ends of the mounting plate, and the support plate, the upper mounting seat and the lower mounting seat collectively construct a space in a U-shaped structure for fixing the imaging apparatus.

Preferably, a button for adjusting lens is provided on the imaging apparatus, a servo is provided on the third support, and an output shaft of the servo is provided with a V-shaped fork for moving the button back and forth.

Preferably, the servo is provided in the upper mounting seat.

Preferably, the lower mounting seat is provided with an inner cavity, and a gyroscope for controlling attitude of the gimbal is provided in the inner cavity.

Preferably, an IMU frame complying with shape of the inner cavity is provided in the inner cavity.

The present utility application has advantageous technical effect in that, with the mounting structure of an electronic speed governor, the electronic speed governor is embedded in an arm of a support, which allows the structure of a gimbal to be simple and compact and also provides good protection to the electronic speed governor.

Other features and advantages of the present utility application will be apparent from the following description of the exemplary embodiments of the present utility application with reference to the attached drawings.

DESCRIPTION OF THE ATTACHED DRAWINGS

The accompanying drawings, included in the specification as a part thereof, describe the embodiments of the present utility application, and are used to explain the principle of the present utility application, together with the specification.

FIG. 2 shows a schematic structure diagram of the gimbal according to the present utility application in a case where an imaging device is not carried on;

DETAILED DESCRIPTION

Various exemplary embodiments of the present utility application will now be described in detail with reference to the attached drawings. It is to be noted that the relative arrangement, numbers, expressions and values of components and steps set forth in these embodiments are not intended to limit the scope of the present utility application, unless otherwise specified.

In fact, the following description of at least one exemplary embodiment is illustrative, and does never limit the scope of the present utility application and its application and usage.

The technology and equipment well known to the person skilled in the related art will not be discussed in detail, however, in some cases, the technology and equipment should be deemed as a part of the present specification.

In all examples shown and discussed herein, any particular values or amounts should be construed as merely illustrative, rather than as limitation. Therefore, other examples of the exemplary embodiments may have different values or amounts.

It is to be noted that like symbols and letters are used to indicate like components in the following figures, and therefore, once a certain component is defined in one figure, its discussion in the subsequent figures will be omitted.

Figure 1:
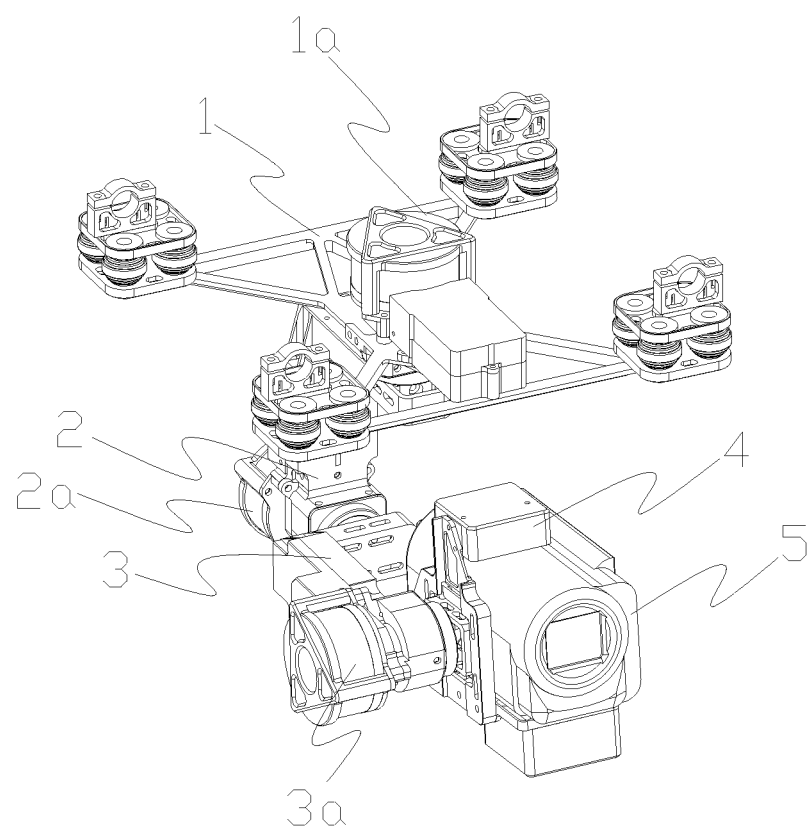
FIG. 1 shows a schematic structure diagram of the gimbal according to the present utility application.
Figure 2:
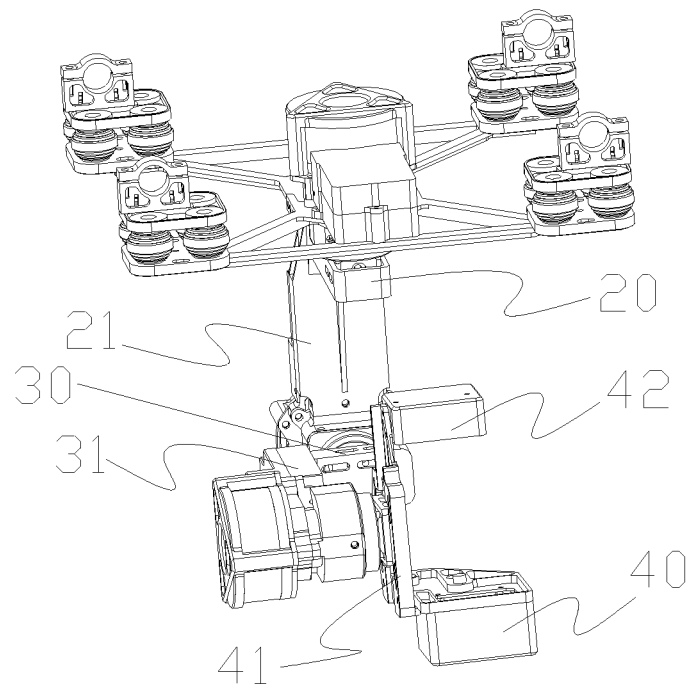

With reference to FIG. 1 and FIG. 2, the present utility application discloses a gyroscopic self-balance gimbal, the gimbal includes a base 1 capable of being fixed to a carrier body which may be a unmanned aerial vehicle, an automobile, a ship, or the like, the base 1 is rotatably connected with a first support 2 by a base electric motor 1a, the first support 2 is rotatably connected with a second support 3 by a first support electric motor 2a, and the second support 3 rotates a third support 4 for carrying an image apparatus 5 through a second support electric motor 3a, whereby, the first support 2, the second support 3, and the third support 4 can be independently rotated respectively on a Z axis, an X axis, and a Y axis to achieve dynamic balance compensation of the gimbal.

Figure 3:
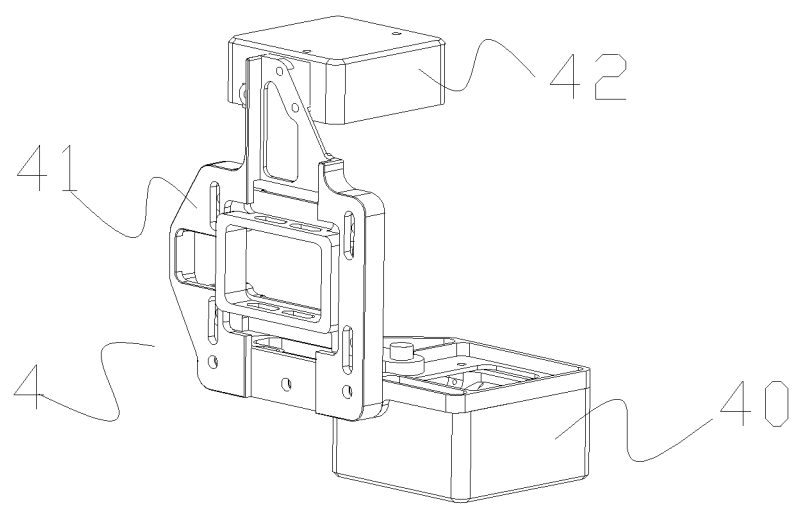
FIG. 3 shows a schematic structure diagram of a third support shown in FIG. 1.

With reference to FIG. 3, the third support 4 of the present utility application includes a support plate 41 for rotatably connecting with the second support 3, and includes an upper mounting seat 42 and a lower mounting seat 40 respectively fixed on both ends of the support plate 41 respectively, and the support plate 41, the upper mounting seat 42 and the lower mounting seat 40 collectively construct a space in a U shaped structure for fixing an imaging device 5. With this structural arrangement, it allows the gimbal to have relative simple structure and small weight, and allow electric motors to control the gimbal to carry out dynamic compensation in an easier way.

In the present utility application, the first support 2 is an L-shaped arm, and includes a first arm 20 for connecting with the base 1 and a second arm 21 for connecting the second support 3.

The first support 2 may have a same structure as the second support 3, that is, is also an L-shaped arm. In order to distinguish the second support from the first support 2, the second support 3 includes a third arm 30 for connecting with the first support and a fourth arm 31 for connecting with the third support 4.

In the present utility application, by employing an L-shaped arm design for the first support 2 and the second support 3, the structure of the gimbal can be further simplified, and moreover, the stability of the whole gimbal is not affected, and the control on the respective supports by the electric motors is further facilitated.

The present utility application further provides mounting structures for the electric motors in the gimbal. Taking the first support electric motor 2a as an example, its mounting structure is as follows: in the first support 2, a free end of the second arm 21 is provided with a mounting groove, a mounting plug for fitting with the mounting groove is provided on the first support electric motor 2a, and the mounting plug and the mounting groove are fixed by screws. In this way, the first support electric motor 2a is mounted on the free end of the second arm 21, so that the first support electric motor 2a can be mounted in a simple and stable manner.

Figure 5:
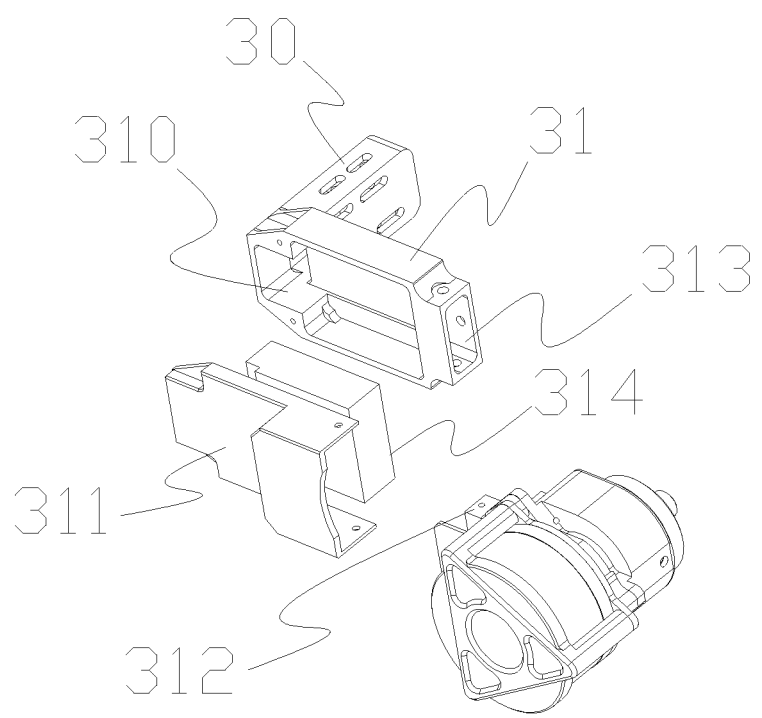
FIG. 5 shows a partially explored diagram of a second support in the gimbal according to the present utility application.

The second support electric motor 3a has a same mounting structure as that of the first support electric motor 2a. With reference to FIG. 5, the second support 3 is an L-shaped arm, a free end of the fourth arm 31 is provided with a mounting groove 313, and a mounting plug 312 for fitting with the mounting groove 313 is provided on the second support electric motor 2a. When the electric motor is mounted, the mounting plug 312 of the second support electric motor 2a is inserted into the mounting groove 313 on the end of the fourth arm 31, and is fixed therewith by screws.

The present utility application further provides a mounting structure for an electronic speed governor in the gimbal. With reference to FIG. 5, in the second support 3, the fourth arm 31 is provided, at a sidewall thereof, with a recess 310 in which the electronic speed governor 314 is provided, and further includes a cover 311 for enclosing the recess 310. In this mounting structure for the electronic speed governor, the electronic speed governor 314 is embedded in the fourth arm 31, and is enclosed by the cover 311; in this way, not only the structure is compact, but also the electronic speed governor is well protected.

The mounting structure for the electronic speed governor on the first support 2 is same as that on the second support 3; at a sidewall of the second arm 31 of the first support 2, a recess in provided, the electronic speed governor is provided in the recess, and a cover for enclosing the recess is further included. Preferably, the recess is arranged along a lengthwise direction of the second arm.

Figure 6:
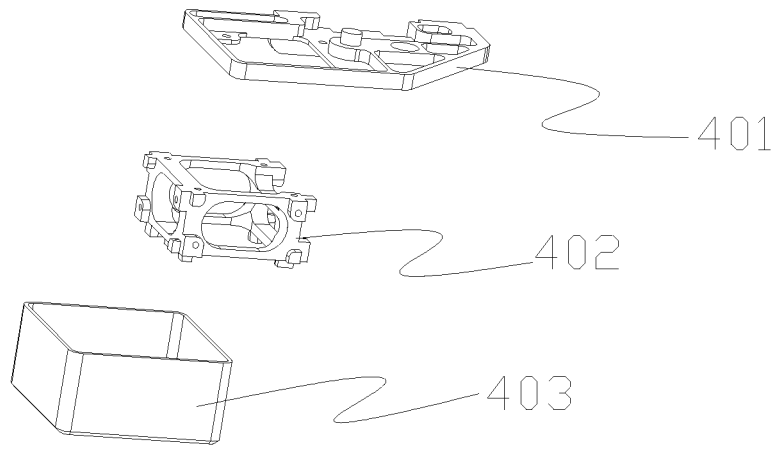
FIG. 6 shows an explored diagram of a mounting seat according to the present utility application.

The present utility application further provides a mounting structure for a gyroscope in the gimbal. The lower mounting seat 40 is provided with an inner cavity in which the gyroscope for controlling attitude of the gimbal is provided. Specifically referring to FIG. 6, the lower mounting seat 40 includes a housing 403 provided with an inner cavity, the gyroscope is mounted in the housing 403, and is enclosed by a cover 401. With this structure, not only the gyroscope is well protected, but also the whole structure becomes simple and compact. Preferably, an IMU (inertial measurement unit) frame 402 complying with the shape of the inner cavity is further provided in the inner cavity, the IMU frame is known in the related art, and will not be further described herein.

Figure 4:
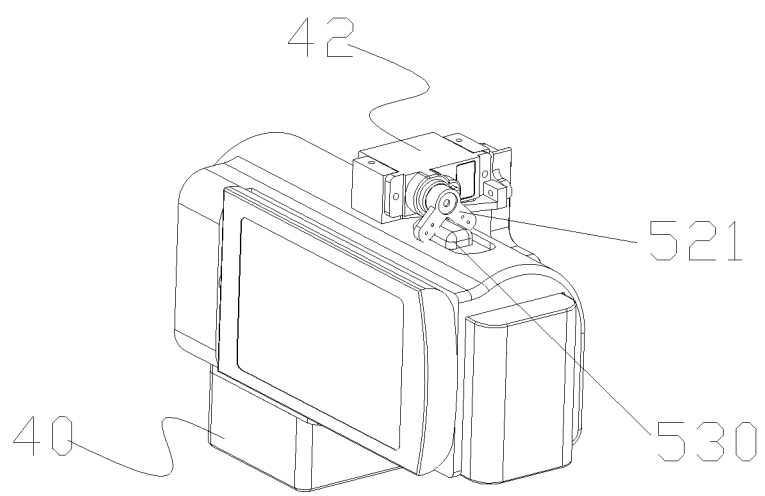
FIG. 4 shows a schematic structure diagram of the third support and the imaging device.

The present utility application further provides a driving assembly for adjusting a lens in the gimbal. With reference to FIG. 4, the imaging device 5 is provided with a button 530 for adjusting the lens thereof, the third support 4 is provided with a servo, and an output shaft of the servo is provided with a V-shaped fork 521 for moving the button back and forth. In this way, the servo is controlled to move as necessary, so that the V-shaped folk 521 drives the button to move to adjust the lens, and thus the aerial shooting performance is improved.

While some specific embodiments of the present utility application have been described in detail above by way of examples, it is appreciated to the person skilled in the art that these examples are only for illustrating, rather than limiting the scope of the present utility application. It should be understood by the person skilled in the art that modification can be made on the above embodiments without departing from the scope and spirit of the present utility application. The scope of the present utility application is defined by the appended claims.

What is claimed is:

1. A gimbal including a base, a fixing support rotatably provided on the base, and a gyroscope,
   wherein the fixing support includes a first mounting seat and a second mounting seat, the second mounting seat is provided with an inner cavity therein;
   wherein the gyroscope is provided in the inner cavity of the second mounting seat;

wherein the fixing support further includes a support plate;

wherein the support plate is rotatably connected to the base, and the first mounting seat and the second mounting seat are respectively fixed at both ends of the support plate; and wherein the support plate, the first mounting seat and the second mounting seat collectively construct a U-shaped structure.

2. The gimbal according to claim 1, wherein the first mounting seat and the second mounting seat are opposite to each other to provide a space for mounting an image apparatus between the first mounting seat and the second mounting seat.

3. The gimbal according to claim 1, further including an electric motor, wherein the electric motor is provided on the base and is rotatably connected with the support plate, whereby the support plate is rotatably connected to the base; and the electric motor is capable of driving the fixing support to rotate.

4. The gimbal according to claim 1, further including a first support and a second support, wherein the first support is rotatably connected to the base;

the second support is rotatably connected to the first support; and the support plate of the fixing support is rotatably connected to the second support so as to be rotatably connected to the base.

5. The gimbal according to claim 4, further including a base electric motor, wherein the base electric motor is fixed on the base and is rotatably connected with the first support, whereby the first support is rotatably connected to the base; and the base electric motor is capable of driving the first support to rotate about a first rotation axis.

6. The gimbal according to claim 5, further including a first electric motor, wherein the first electric motor is fixed on the first support and is rotatably connected with the second support, whereby the second support is rotatably connected with the first support; and the first electric motor is capable of driving the second support to rotate about a second rotation axis, and the first rotation axis is different from the second rotation axis.

7. The gimbal according to claim 6, wherein the first support includes a first arm and a second arm connected with each other to construct an L shape;

the first arm is rotatably connected to the base electric motor, whereby the first support is rotatably connected to the base;

the first support is capable of being driven by the base electric motor to rotate; and the second arm is configured to mount the first electric motor.

8. The gimbal according to claim 6, further including a second electric motor, wherein the second electric motor is fixed on the second support and is rotatably connected with the support plate of the fixing support, whereby the support plate of the fixing support is rotatably connected to the second support; and the second electric motor is capable of driving the fixing support to rotate about a third rotation axis, and the third rotation axis is different from both the first and second rotation axis.

9. The gimbal according to claim 8, wherein, the second support includes a third arm and a fourth arm connected with each other to construct an L shape, the third arm is rotatably connected with the first electric motor, whereby the second support is rotatably connected to the first support, the second support is capable of being driven by the first electric motor to rotate; and the fourth arm is configured to mount the second electric motor.

10. The gimbal according to claim 9, wherein the first rotation axis, and the second rotation axis, and the third rotation axis are perpendicular to each other.

11. The gimbal according to claim 4, further including a second electric motor, wherein the second electric motor is fixed on the second support and is rotatably connected with the support plate of the fixing support, whereby the support plate of the fixing support is rotatably connected to the second support; and the second electric motor is capable of driving the fixing support to rotate.

12. The gimbal according to claim 11, wherein the second support includes a third arm and a fourth arm connected with each other to construct an L shape;

the third arm is rotatably connected with the first support, whereby the second support is rotatably connected to the first support;

the second support is capable of being driven by the first electric motor to rotate; and the fourth arm is configured to mount the second electric motor.

13. The gimbal according to claim 12, wherein a rotation axis about which the first support is rotated, a rotation axis about which the second support is rotated and a rotation axis about which the fixing support is rotated are perpendicular to each other.

14. The gimbal according to claim 1, wherein the first mounting seat is provided with a servo, and the servo includes an output shaft and a fork provided at an end of the output shaft.

15. The gimbal according to claim 14, wherein the fork is of V-shaped.

16. The gimbal according to claim 1, wherein an IMU frame complying with a shape of the inner cavity is provided in the inner cavity.

17. An unmanned aerial vehicle including a gimbal, wherein the gimbal includes a base, a fixing support rotatably provided on the base, and a gyroscope, wherein the fixing support includes a first mounting seat and a second mounting seat, the second mounting seat is provided with an inner cavity therein;

wherein the gyroscope is provided in the inner cavity of the second mounting seat; and wherein the fixing support further includes a support plate, the support plate is rotatably connected to the base, and the first mounting seat and the second mounting seat are respectively fixed on both ends of the support plate, and the support plate, the first mounting seat and the second mounting seat collectively construct a U-shaped structure.

18. The unmanned aerial vehicle according to claim 17, wherein the first mounting seat and the second mounting seat are opposite to each other to provide a space for mounting an image apparatus between the first mounting seat and the second mounting seat.

\* \* \* \* \*